G. Meaders. Hay Loader & Carrier.

104480

PATENTED JUN 21 1870

Witnesses:
S. S. Mabee
Alex F. Roberts

Inventor:
G. Meaders
Per Munn & Co.
Attorneys

United States Patent Office.

GALEN MEADERS, OF JEFFERSONVILLE, INDIANA, ASSIGNOR TO HIMSELF AND ROZEL WEISSINGER, OF LOUISVILLE, KENTUCKY.

Letters Patent No. 104,480, dated June 21, 1870.

IMPROVEMENT IN HAY-GATHERER AND CARRIER.

The Schedule referred to in these Letters Patent and making part of the same.

To all whom it may concern:

Be it known that I, GALEN MEADERS, of Jeffersonville, in the county of Clarke and State of Indiana, have invented a new and useful Improvement in Hay-Loader and Carrier; and I do hereby declare that the following is a full, clear, and exact description thereof, which will enable others skilled in the art to make and use the same, reference being had to the accompanying drawing forming part of this specification.

This invention relates to a new and useful improvement in a vehicle for gathering and transporting hay, and consists of a platform, of triangular or other shape, mounted on wheels or trucks at its rear or base ends, with its front end arranged to run in contact with the ground, so as to gather the hay from the surface, and, in combination therewith, the arrangement for binding and fastening the hay, and guiding the vehicle, as will be hereinafter more fully described.

In the accompanying drawing—

Similar letters of reference indicate corresponding parts.

A is the platform, broad at the rear or base end, and diminishing in breadth to near a point at its front end, but I do not claim any particular form or size for the platform, nor any particular manner or mode of constructing it.

Near the rear end is an axle, B, to which the platform is attached.

C represents the wheels.

D is a bar or handle for guiding the vehicle.

Figure 1:
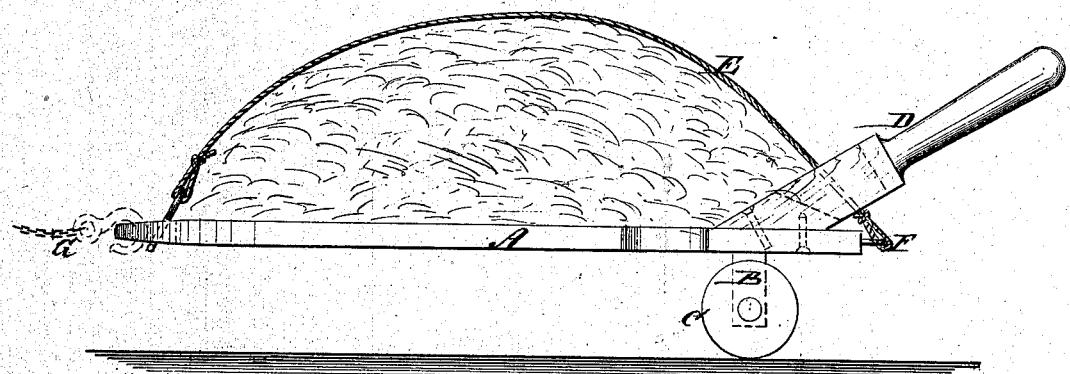
Figure 1 represents a side view with the platform loaded as when ready for transportation.
Figure 2:
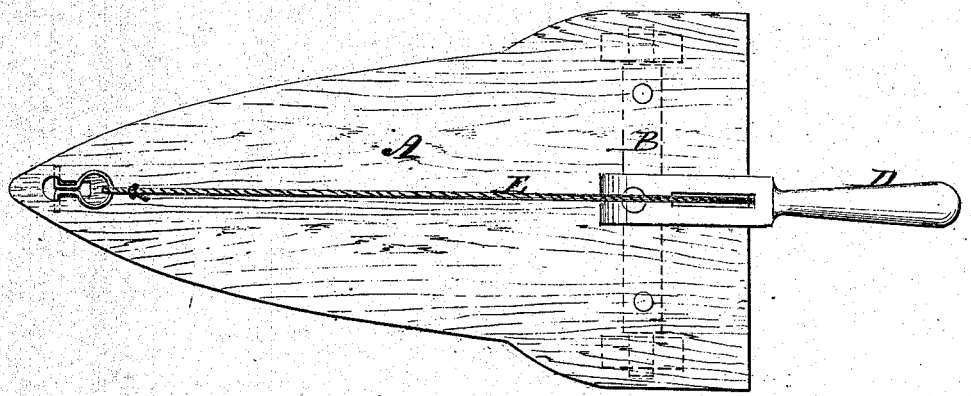
Figure 2 is a top or plan view.

E is a rope or chain for fastening the hay on the platform after loading, as seen in fig. 1.

This rope passes through the bar D, and is attached to the rear end, as seen at F.

The team is attached by means of the chain G.

The vehicle is drawn with the front end in contact with the ground, guided by an attendant, and the hay is gathered from the windrow or swath until the platform is filled, as seen.

When thus filled, the rope is carried forward over the hay, and fastened at the front by a T, or in any suitable manner.

Loaded thus, the vehicle is transported to the stack or barn, and disposed of as circumstances may require.

This is a cheap and simple labor-saving device, and its advantages will be readily understood by farmers.

Having thus described my invention,

I claim as new and desire to secure by Letters Patent—

The platform A, provided with wheels, and steering or guiding-bar, D, and fastening-rope E, constructed, combined, arranged, and operating substantially as and for the purposes herein shown and described.

GALEN MEADERS.

Witnesses:
S. S. JOHNSON,
A. J. HOWARD.